United States Patent [19]

Duffield et al.

[11] Patent Number: 4,498,689
[45] Date of Patent: Feb. 12, 1985

[54] STORAGE REEL FOR DOOR MOUNTED RESTRAINT BELT

[75] Inventors: Thomas P. Duffield, Pontiac; James A. Winnale, Warren, both of Mich.

[73] Assignee: General Motors Corporation, Detroit, Mich.

[21] Appl. No.: 494,403

[22] Filed: May 13, 1983

[51] Int. Cl.³ .............................................. B60R 21/02
[52] U.S. Cl. ................................ 280/803; 242/107.7; 280/807
[58] Field of Search ............... 280/801, 802, 803, 807, 280/808; 242/107.4 R, 107.6, 107.7

[56] References Cited

U.S. PATENT DOCUMENTS

| | | | |
|---|---|---|---|
| 3,491,966 | 1/1970 | Curran et al. | 242/107.4 R |
| 3,550,875 | 12/1970 | Settimi | 242/107.4 R |
| 3,700,184 | 10/1972 | Francis | 242/107.4 R |
| 4,007,802 | 2/1977 | de Rosa | 280/803 |
| 4,241,938 | 12/1980 | Patel et al. | 280/803 |
| 4,323,267 | 4/1982 | Takada | 280/803 |

FOREIGN PATENT DOCUMENTS 2421764 12/1979 France ................................ 280/803

Primary Examiner—Joseph F. Peters, Jr.
Assistant Examiner—Kenneth R. Rice
Attorney, Agent, or Firm—Charles E. Leahy

[57] ABSTRACT

A vehicle belt system includes a restraint belt having shoulder belt and lap belt ends mounted on the door and an anchor belt mounted inboard the occupant seat and connected to the restraint belt by a disconnect buckle. A storage retractor mounted on the door has the shoulder or lap belt end connected thereto. A spring biases the reel in the belt winding direction. A pawl and ratchet mechanism is operable by a reel driven cam to lock the reel in response to full unwinding of the belt from the reel so that the belt is normally held at the fully extended length appropriate for restraint of seated occupant. The retractor also includes a release device which unlocks the pawl and ratchet mechanism so that the restraint belt will be retracted and stored upon the spring wound reel when the disconnect buckle is released. The release device is preferably an electrical switch in the release buckle which controls an electromagnet for unlocking the pawl and ratchet mechanism or a manually operable push button mounted on the door for unlocking the pawl and ratchet mechanism.

3 Claims, 7 Drawing Figures

STORAGE REEL FOR DOOR MOUNTED RESTRAINT BELT

This invention relates to a passive occupant restraining lap and shoulder belt system and more particularly provides a reel on the door for storing the restraint belt upon release of disconnect buckle joining the restraint belt with a retractably mounted anchor belt.

BACKGROUND OF THE INVENTION

It is well known in motor vehicles to restrain an occupant in the vehicle seat by a lap belt disposed across the lap and a shoulder belt disposed diagonally across the chest.

Furthermore, it is known to mount the outboard ends of the restraint belt on the vehicle door at positions generally adjacent the occupant shoulder and the occupant lap. The restraint belt is connected to an anchor belt mounted inboard the occupant seat by a disconnect buckle assembly including a buckle and a latch plate. The anchor belt may be a fixed length so that the restraint system is a so-called active belt system in which the occupant buckles the belt subsequent to vehicle entry or a so-called passive belt system where the anchor belt is retractably mounted inboard the occupant seat so that the belt is automatically moved between occupant ingress and occupant restraining positions by the swing geometry of the vehicle door. In such a passive belt system the buckle is disconnected for vehicle maintenance or when the vehicle user wishes to use the restraint belt system in its active mode of operation.

The present invention relates to an improvement in the aforedescribed door mounted belt system and more particularly provides a storage reel on the door for winding and storing the belt when the disconnect buckle is released.

SUMMARY OF THE INVENTION

According to the invention, the vehicle belt system includes a restraint belt having shoulder belt and lap belt ends mounted on the door and an anchor belt having a first end mounted inboard the occupant seat and a second end releasably connected to the restraint belt by a disconnect buckle. A storage retractor mounts one of the shoulder and lap belt ends on the door. The storage retractor includes a reel rotatably mounted on the door and having the belt end connected thereto. A spring biases the reel in the belt winding direction. A pawl and ratchet mechanism is operable between a locked condition to block the reel from belt winding rotation and unlocked condition enabling spring wound rotation of the reel. A control device, preferably a cam, is coupled to the reel for rotation therewith and functions to operate the pawl and ratchet mechanism to the locked condition in response to full unwinding of the belt from the reel so that the belt is normally held at the fully extended length appropriate for restraint of seated occupant. The retractor also includes a release device which operates the pawl and ratchet mechanism to the unlocked condition so that the restraint belt will be retracted and stored by the spring wound reel when the disconnect buckle is released. The release device is preferably an electrical switch in the release buckle which controls an electromagnet for operating the pawl and ratchet mechanism or a manually operable push button mounted on the door for operating the pawl and ratchet mechanism.

The object, feature and advantage of the present invention resides in the provision of a storage retractor mounted on the door and having a pawl and ratchet mechanism operable between a locked condition to lock the reel against belt winding rotation to hold the belt at the fully extended length for occupant restraint and a release means adapted to selectively operate the pawl and ratchet mechanism to the unlocked condition to enable spring wound reel rotation to retract and store the restraint belt on the door upon release of the disconnect buckle.

DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
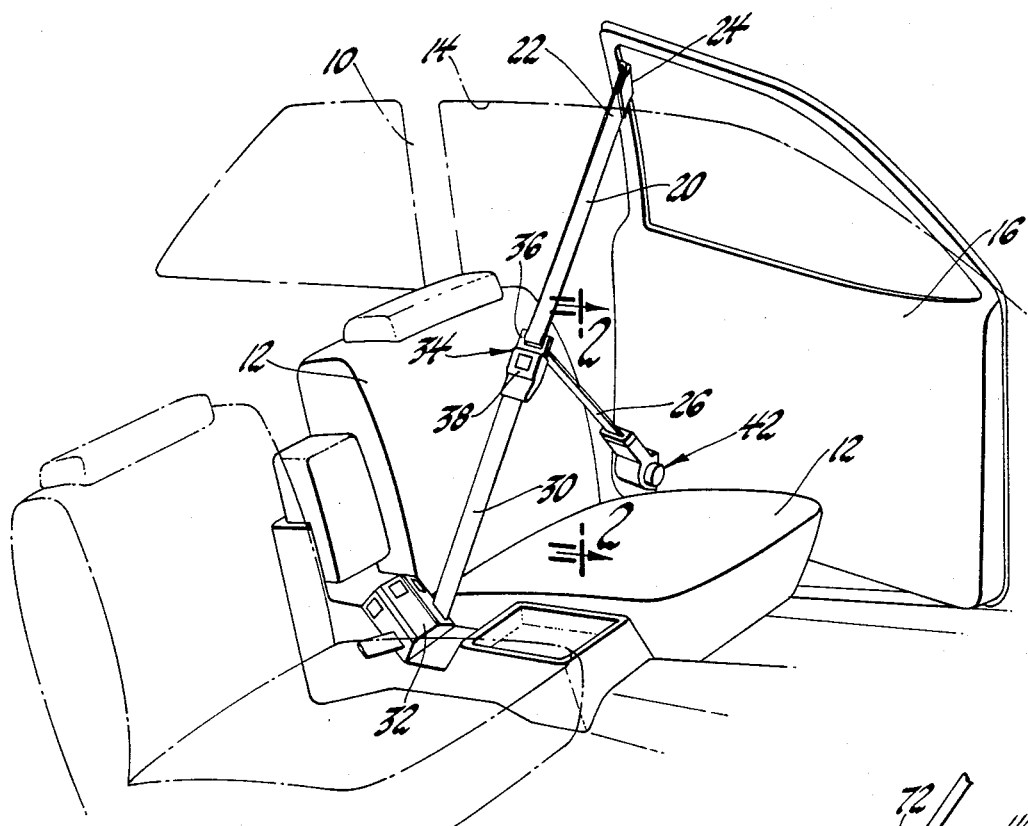
FIG. 1 is a perspective view of a vehicle body having a door mounted passive restraint system according to the invention and showing the door in the open position.

Referring to FIG. 1 there is shown a vehicle body 10 having a seat 12 located laterally adjacent a door opening 14. A door 16 is hingedly mounted on the vehicle body 10 for swinging movement between an open position as shown in FIG. 1 and a closed position. A three-point continuous-loop occupant restraint belt for restraining an occupant on the seat 12 includes a continuous-loop restraint belt 20 having an upper end 22 attached to the upper rear corner of the door by an anchor plate 24 and a lower end 26 attached to the lower rear corner of the door.

An anchor belt 30 has an inboard end which is retractably mounted by a retractor 32 suitably mounted on the vehicle body inboard the occupant seating position. The retractor 32 is preferably of the vehicle inertia sensitive type having a lock bar which is engaged with a belt reel by a pendulum or other inertia responsive member upon the occurrence of a predetermined level of vehicle deceleration.

The anchor belt 30 is connected to the continuous-loop restraint belt 20 by a disconnect buckle assembly 34. The disconnect buckle assembly 34 includes a latch plate 36 which is slidable along the continuous-loop restraint belt 20 and a buckle 38 which is attached to the anchor belt 30.

The aforedescribed restraint belt arrangement may be operated as a passive belt system or as an active belt system. As a passive belt system, the disconnect buckle assembly 34 remains connected so that the opening and closing of the door winds and unwinds the anchor belt 30 from the anchor belt retractor 32 so that the swing geometry of the door automatically moves the restraint belt 20 between an occupant restraint position and an occupant access position, shown in FIG. 1. The occupant may disconnect buckle assembly 34 for vehicle maintenance or on such other occasions as desired.

In the active mode of operation, the disconnect buckle assembly 34 will be disconnected by the occupant prior to opening the door and alighting from the vehicle. Then upon entry into the vehicle, the occupant will again engage the latch plate 36 within the buckle 38. In those instances where the occupant restraint system will always be used in the active mode, the anchor belt 30 may be fixedly anchored upon the vehicle body without the use of an anchor belt retractor 32.

Referring again to FIG. 1, it is seen that the lower end 26 of the continuous-loop restraint belt 20 is mounted upon the vehicle door 16 by a storage retractor 42.

Figure 2:
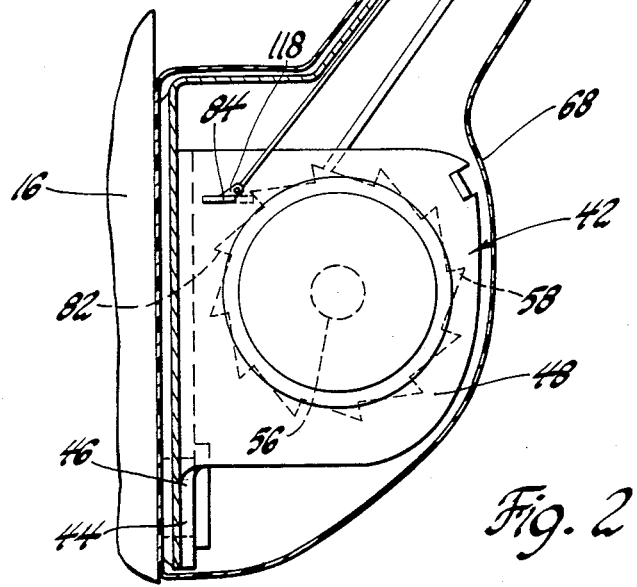
FIG. 2 is a sectional view taken in the direction of arrows 2—2 of FIG. 1 showing a storage retractor mounting the lap belt end of the restraint belt on the vehicle door to store the restraint belt when the disconnect buckle coupling the restraint belt with the inboard mounted anchor belt is released.
Figure 3:
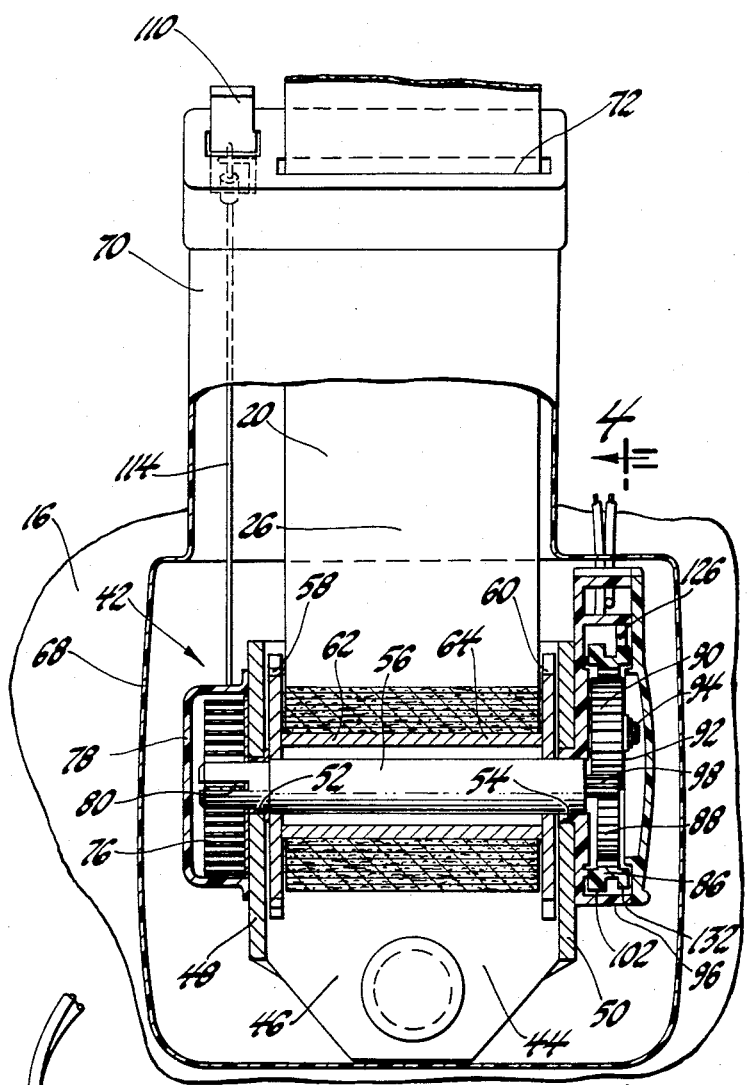
FIG. 3 is a frontal elevation view of the storage retractor having parts broken away and in section.

Referring to FIGS. 2 and 3, it is seen that the storage retractor 42 includes a stamped steel frame 44 including a base 46 which is suitably bolted or otherwise attached to the door 16 and laterally spaced apart walls 48 and 50. The walls 48 and 50 have aligned apertures 52 and 54 which receive a rotatable amount of reel shaft 56. A pair of ratchet plates 58 and 60 are attached to the reel shaft 56 and cooperate with a connecting tube 62 extending therebetween to define a belt reel 64. The lower end 26 of the continuous-loop restraint belt 20 is conventionally attached to the reel 64. The retractor 42 is enclosed within a housing 68, preferably of molded plastic, which defines a snorkel 70 having a slot 72 through which the belt 20 exits the retractor adjacent the occupant lap.

The storage retractor 42 has a spiral spring enclosed within a plastic cover 78. One end of the spiral spring is anchored on the plastic cover and the other end seats within a slot 80 in the end of the reel shaft 56. The spiral spring 76 is wound up as the belt reel 64 is rotated in the belt unwinding direction by extension of the belt 20 from the reel 64. Accordingly the spiral spring 76 provides a bias upon the reel 64 in the direction to rotate the reel 64 in the belt winding direction of rotation.

A pawl and ratchet mechanism for selectively locking the reel 64 against belt winding rotation includes ratchet teeth 82 on the ratchet plates 58 and 60 and a lock bar 84 having its ends pivotally seated within apertures of the frame walls 48 and 50 for selective engagement with the ratchet teeth 82 of the ratchet plates 58 and 60.

Figure 4:
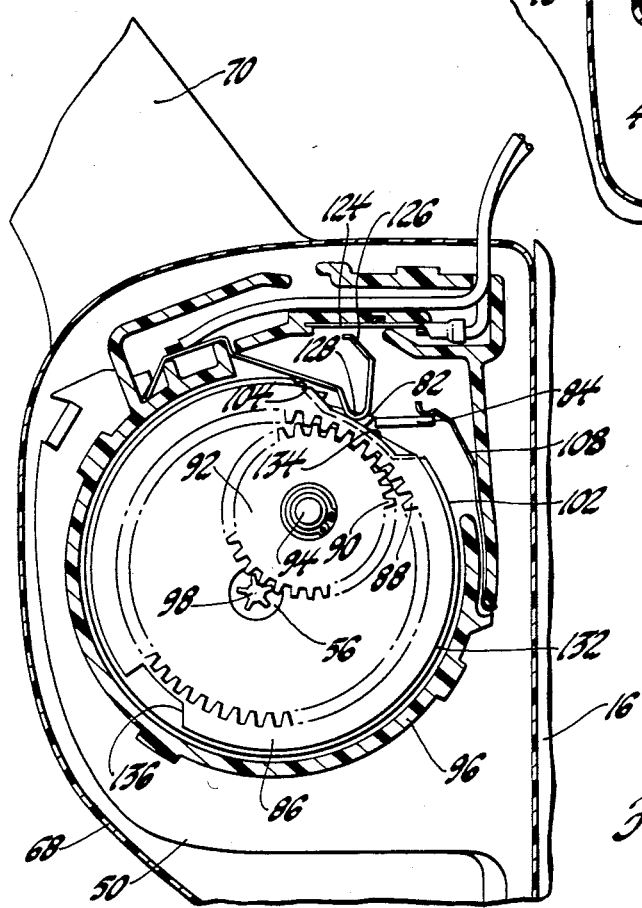
FIG. 4 is a sectional view taken in the direction of arrows 4—4 of FIG. 3.

Referring to FIGS. 3 and 4, it is seen that a mechanism for controlling the lock bar 84 includes a ring gear cam member 86 having ring gear teeth 88 along the inner periphery thereof which mesh with teeth 90 of an idler gear 92 rotatably journaled upon a shaft portion 94 of a plastic housing 96 which encloses and rotatably supports cam member 86. The idler gear 92 in turn meshes with a pinion gear 98 integral with the end of the reel shaft 56. The pinion gear 98 and idler gear 92 provide a speed reduction gear set which rotates the cam member 86 through less than one complete revolution during a plurality of revolutions of the reel 64 during movement of the belt between the fully wound and stored condition upon the reel 64 and a condition of full extension from the reel 64.

As seen in FIG. 4, the cam member 86 has an outer peripheral surface which includes a radially raised cam surface 102 and a notch portion 104 having a lesser radial dimension than the cam surface 102. The end of the lock bar 84 overlies the cam surface 102 as best seen in FIG. 4. When the belt 20 is fully extended from the storage retractor 42, as shown in the drawings, the rotation of the reel 64 in the belt unwinding direction will have established the cam member 86 in the rotary position of FIG. 4 in which the notch portion 104 is aligned with the lock bar 84 to unblock the lock bar 84 and enable a leaf spring 108 to bias the lock bar 84 into engagement with the ratchet teeth 82 carried by the ratchet plates 58 and 60. Accordingly, the reel 64 is blocked against rotation in the belt winding direction by the spiral spring 76 so that the belt 20 is held at its fully extended condition to enable conventional restraint of the vehicle occupant. The cam surface 102 will function to block movement of the lock bar 84 to this locking condition of engagement with the ratchet teeth 82 until the belt 20 reaches its fully extended condition.

Referring again to FIGS. 2 and 3, it is seen that a manually operable push-button arrangement is provided to enable the occupant to move the lock bar 84 out of locking engagement with the reel 64. The push-button arrangement includes a button 110 which is rotatably mounted on the pivot 112. A wire 114 is connected to a laterally offset pin 116 carried by the button 110 and has its other end suitably connected to a lever 118 mounted to the end of the lock bar 84. Accordingly, when the occupant desires to store the restraint belt 20 on the storage retractor upon unbuckling the disconnect buckle assembly 34, the occupant manually pivots the button 110 which in turn lifts the lock bar 84 out of engagement with the ratchet teeth 82 of the ratchet plates 58 and 60. Accordingly, the spiral spring 76 is permitted to bias the reel 64 in the belt winding direction so that the restraint belt 20 is wound and stored upon the storage retractor 42.

The storage retractor 42 also includes an electrical reminder switch for completing an electrical circuit for a buzzer to remind the occupant to fully unwind the belt 20 from the storage retractor 42 and to connect the disconnect buckle assembly 34. The reminder switch includes a fixed contact 124 and a movable contact 126. The movable contact 126 is a leaf spring and has a cam follower portion 128 which rides on a cam surface 132 of the cam member 86. When the belt is fully extended from the reel 64, the cam follower portion 128 seats within a notch 134 of the cam member 86 to permit the movable contact 126 to move away from fixed contact 124 as shown in FIG. 4. Likewise when the belt is fully stored upon the reel 64, the cam follower portion 128 seats within a notch 136 of the cam member 86 to permit the movable contact 126 to move away from the fixed contact 124. Whenever the belt is partially wound upon the reel 64, the cam surface 132 lifts the movable contact 126 into electrical contact with the fixed contact 124 so that the switch is closed. A description of the reminder circuit may be had by reference to FIG. 7 and the description thereof which appears hereinafter.

Figure 5:
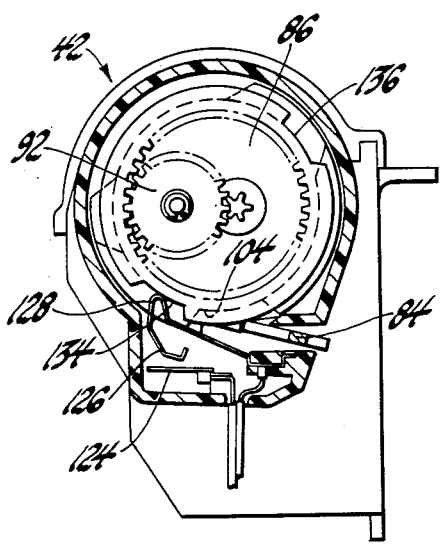
FIGS. 5 and 6 are views similar to FIG. 4 but showing a different embodiment of the storage retractor of this invention.
Figure 6:
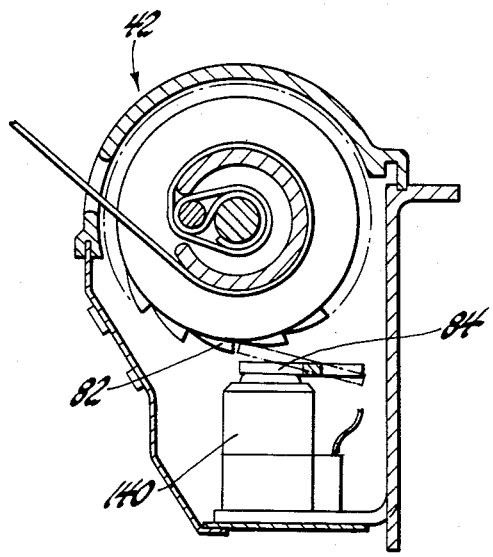

Referring to FIGS. 5 and 6 there is shown another embodiment of the storage retractor 42 in which like elements are designated by like numerals. The significant difference in the embodiment of FIGS. 5 and 6 is that the lock bar 84 is disengaged from the ratchet teeth 82 of the ratchet plates 58 and 60 by an electromagnet 140.

Figure 7:
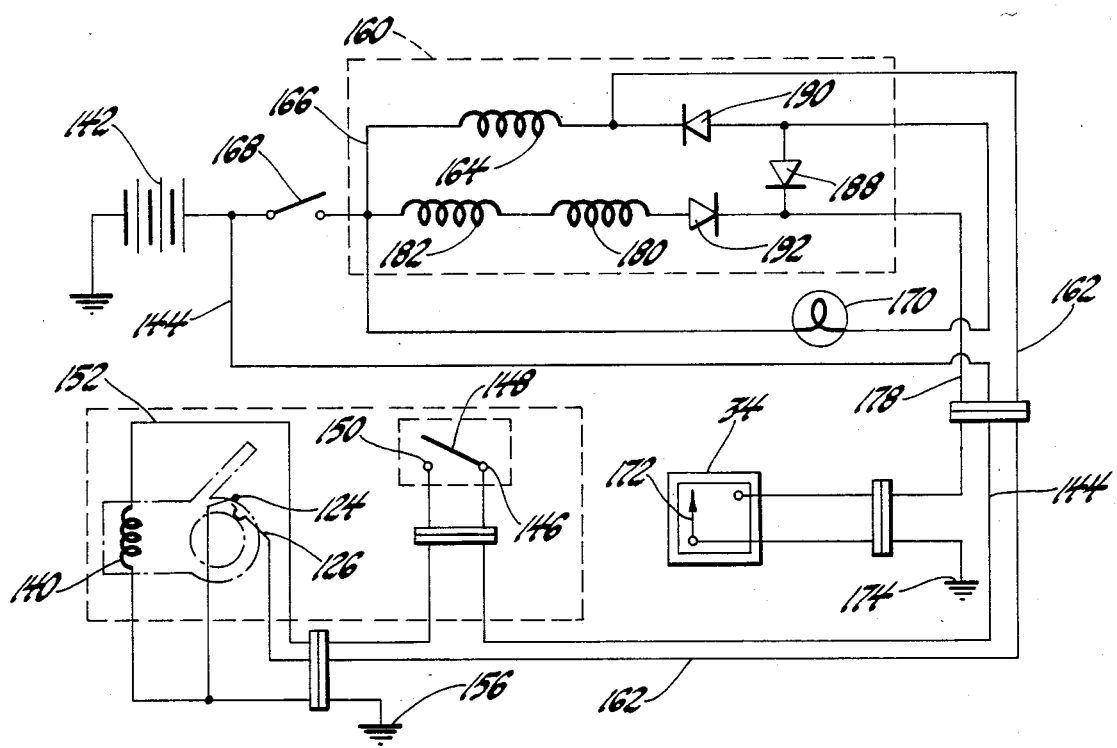
FIG. 7 is an electrical circuit for use in conjunction with the storage retractor of FIGS. 5 and 6.

Referring to FIG. 7, there is shown an electrical circuit for reminding the occupant to buckle the belt and also for energizing the electromagnet 140 to disengage the lock bar 84 from the ratchet teeth 82 of the reel 64. The circuit includes a battery 142 having one side connected by a wire 144 with a contact 146 of a switch 148. When the seat occupant momentarily closes the switch 148 against a switch contact 150, the battery is connected to the electromagnet 140 via wire 152. The other side of the electromagnet 140 is connected to a ground 156. The resulting energization of the electromagnet 140 causes the electromagnet to withdraw the lock bar 84 from engagement with the ratchet teeth 82 of the reel 64. Disengagement of the lock bar 84 permits the spiral spring 76 to rotate the reel 64 in the belt winding direction and initiate windup and the storage of the belt on the reel.

If and when the disconnect buckle assembly 34 is released the rotation of reel 64 continues and cam member 86 is rotated such that the notch 134 is moved from beneath the movable switch contact 126 and the cam surface 132 lifts the movable contact 126 into electrical contact with the fixed contact 124. The fixed contact 124 is connected to the ground 156. The movable contact 126 is connected to a sound generator circuit 160 by a wire 162. The sound generator circuit 160 includes a buzzer 164 which is connected to the battery 142 through a wire 166 and the vehicle ignition switch 168. Thus, the buzzer 164 will continue to sound until the belt is fully wound upon the storage retractor and the notch 136 of the cam member 86 is aligned with the movable contact 126 to permit the movable contact 126 to move away from fixed contact 124. This opens the circuit and deenergizes the buzzer 164.

A warning lamp 170 is connected in parallel with the buzzer 164 and bears a legend instructing the seat occupant to extend the belt from the retractor. This reminds the occupant that the belt must be extended from storage and the disconnect buckle must be reconnected.

The circuit also includes a buckle switch 172 mounted within the disconnect buckle assembly 34. One side of the buckle switch 172 is connected to a ground 174. The other side of the buckle switch 172 is connected with the sound generator circuit 160 by a wire 178. Wire 178 is connected through a buzzer 180 which is coupled with the battery 142 through a timer 182 and the wire 166 and ignition switch 168. The timer 182 functions to switch the buzzer 180 from the battery 142 to open after a predetermined lapse of time such as four to eight seconds. Accordingly, the occupant is reminded to buckle the belt whenever the ignition switch is turned on even though the belt may have already been extended from the storage retractor 42 and movable contact 126 moved away from the fixed contact 124 to deenergizing the continuous buzzer 164. The buckle switch 172 is also connected to the warning lamp 170 through a diode 188 so that the lamp 170 will also be energized whenever the buckle switch 172 is closed by releasing the disconnect buckle. Diodes 190 and 192 operate to isolate the separate circuits within the sound generator circuit 160.

The switch 148 for energizing the electromagnet 140 and unlatching the lock bar 84 may be mounted at any convenient location within the occupant compartment. For example, the switch 148 could be mounted on the instrument panel or it could be mounted on the door conveniently accessible to the seat occupant. Furthermore, the switch 148 could be incorporated into the disconnect buckle assembly 34 so that the lock bar 84 for the storage retractor would be unlocked whenever storage of the belt is initiated by releasing the disconnect buckle.

Thus it is seen that the invention provides an improvement in door mounted belt systems and more particularly provides a storage reel mounted on the door for winding and storing the belt when the disconnect buckle is released.

The embodiments of the invention in which an exclusive property or privilege is claimed are defined as follows:

1. In combination with a vehicle seat belt system including a restraint belt having shoulder belt and lap belt ends mounted on the door and an anchor belt having a first end mounted inboard of the seat and a second end releasably connected to the restraint belt by a disconnect buckle, a storage retractor mounting one of the shoulder and lap belt ends on the door to store the restraint belt upon release of the disconnect buckle comprising:

a reel rotatably mounted on the door and having the belt end connected thereto, a spring biasing the reel in the belt winding direction, a pawl and ratchet mechanism selectively operable between a locked condition to block the reel from spring wound rotation in the belt winding direction and an unlocked condition enabling spring wound rotation of the reel, control means effective to operate the pawl and ratchet mechanism to the locked condition in response to full unwinding of the belt from the reel, so that the belt is held at the fully extended length for restraint of a seated occupant and means adapted to selectively operate the pawl and ratchet mechanism to the unlocked condition whereby the spring wound reel retracts and stores the restraint belt upon release of the disconnect buckle coupling the anchor belt with the restraint belt.

2. In combination with a vehicle seat belt system including the restraint belt having a shoulder belt and lap belt ends mounted on the door and an anchor belt having a first end mounted inboard of the seat and a second end releasably connected to the restraint belt by a disconnect buckle, a storage retractor mounting one of the shoulder and lap belt ends on the door to store the restraint belt upon release of the disconnect buckle comprising:

a reel rotatably mounted on the door and having the belt end connected thereto;

a spring biasing the reel in the belt winding direction;

a pawl and ratchet mechanism selectively operable between a locked condition to block the reel from spring wound rotation in the belt winding direction and an unlocked condition enabling spring wound rotation of the reel;

cam means drivingly coupled with the reel and adapted to maintain the pawl and ratchet mechanism in the unlocked condition until the belt is fully unwound from the reel and then affect operation of the pawl and ratchet mechanism to the locked condition so that the belt is held at a fully extended length for restraint of a seated occupant; and manually operable release means accessible to the occupant and adapted to operate the pawl and ratchet mechanism to the unlocked condition to permit spring wound rotation of the reel to retract and store the restraint belt on the door upon release of the disconnect buckle coupling the anchor belt with the restraint belt.

3. In combination with a vehicle seat belt system including a restraint belt having shoulder belt and lap belt ends mounted on the door and an anchor belt having a first end mounted inboard of the seat and a second end releasably connected to the restraint belt by a disconnect buckle, a storage retractor mounting one of the shoulder belt and lap belt ends on the door to store the restraint belt upon release of the disconnect buckle comprising:

a reel rotatably mounted on the door and having the belt end connected thereto;

a spring biasing the reel in the belt winding direction;

ratchet teeth carried by the reel;

a pawl operable to locking engagement with the ratchet teeth to block the reel from spring wound rotation in the belt winding direction and an unlocked condition enabling spring wound rotation of the reel;

cam means drivingly coupled with the reel and adapted to block the pawl against engagement with the ratchet teeth until the belt is fully extended from the reel and then affect locking engagement of the pawl with the ratchet teeth so that the belt is held at the fully extended length for restraint of a seated occupant; and control means having an electromagnet energizable to disengage the pawl from the ratchet teeth and an occupant operable electrical switch associated for completing energization of the electromagnet so that the pawl is disengaged from the ratchet teeth to permit spring wound rotation of the reel and windup of the restraint belt to a stored position on the reel in response to release of the disconnect buckle.

* * * * *